US012583137B2

(12) United States Patent
Katsikas

(10) Patent No.: US 12,583,137 B2
(45) Date of Patent: Mar. 24, 2026

(54) SHAVING HEAD

(71) Applicant: BIC Violex Single Member S.A., Anoixi (GR)

(72) Inventor: Georgios Katsikas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 131 days.

(21) Appl. No.: 18/715,403

(22) PCT Filed: Dec. 14, 2022

(86) PCT No.: PCT/EP2022/085900
§ 371 (c)(1),
(2) Date: May 31, 2024

(87) PCT Pub. No.: WO2023/111042
PCT Pub. Date: Jun. 22, 2023

(65) Prior Publication Data

US 2025/0033232 A1 Jan. 30, 2025

(30) Foreign Application Priority Data

Dec. 14, 2021 (EP) .................................... 21214402

(51) Int. Cl.
*B26B 21/22* (2006.01)
*B26B 21/40* (2006.01)

(52) U.S. Cl.
CPC ........ *B26B 21/227* (2013.01); *B26B 21/4018* (2013.01); *B26B 21/4025* (2013.01)

(58) Field of Classification Search
CPC .............. B26B 21/227; B26B 21/4018; B26B 21/4025
See application file for complete search history.

(56) References Cited

U.S. PATENT DOCUMENTS

| | | | | |
|---|---|---|---|---|
| 4,697,342 | A | 10/1987 | Ferraro | |
| 9,676,111 | B2 | 6/2017 | Hahn | |
| 11,571,828 | B2 * | 2/2023 | Johnson | B26B 21/227 |
| 11,780,105 | B2 * | 10/2023 | Patel | B26B 21/225 30/527 |
| 12,226,922 | B2 * | 2/2025 | McNally | B26B 21/225 |
| 12,304,094 | B2 * | 5/2025 | Sgarra | B26B 21/165 |
| 2009/0288304 | A1 * | 11/2009 | Denkert | B26B 21/227 30/346.61 |

(Continued)

FOREIGN PATENT DOCUMENTS

| | | | |
|---|---|---|---|
| EP | 1531030 | A2 | 5/2005 |
| WO | 2014130935 | A1 | 8/2014 |
| WO | 2020089058 | A1 | 5/2020 |

OTHER PUBLICATIONS

International Search Report and Written Opinion issued Mar. 30, 2023 in International Application No. PCT/EP2022/085900 (10 pages).

*Primary Examiner* — Omar Flores Sanchez
(74) *Attorney, Agent, or Firm* — Bookoff McAndrews, PLLC

(57) ABSTRACT

A shaving head for a razor device including a guard configured to receive at least one razor blade and a retaining mechanism moveably connected to the guard and configured to make the at least one razor blade accessible for detachment from the guard when the retaining mechanism is in a detachment position, and related aspects.

15 Claims, 8 Drawing Sheets

(56) References Cited

U.S. PATENT DOCUMENTS

| | | | |
|---|---|---|---|
| 2010/0139103 | A1 | 6/2010 | Miyazaki |
| 2013/0205595 | A1 | 8/2013 | Bykowski et al. |
| 2016/0144519 | A1 | 5/2016 | Hahn et al. |
| 2021/0245377 | A1* | 8/2021 | Paspatis ................ B26B 21/227 |
| 2024/0051164 | A1* | 2/2024 | Chang ................. B26B 21/4031 |
| 2024/0416541 | A1* | 12/2024 | Nakada ................. B26B 21/227 |

* cited by examiner

SHAVING HEAD

This is a National Stage Application under 35 U.S.C. § 371 of International Application No. PCT/EP2022/085900, filed on Dec. 14, 2022, which claims benefit from the European patent application EP 21214402.6, filed on Dec. 14, 2021, the entireties of which are incorporated herein by reference.

FIELD

The present disclosure relates to the field of shaving cartridges, such as refillable shaving cartridges in which a blade is removeable, and a shaving system therefor.

BACKGROUND ART

Most modern shavers include a head, including a cover and a guard for retaining a blade in the head, and a handle for manipulating the head and blade on skin during shaving. Cartridge-type heads are popular, due to the convenience of having the blade permanently retained therein. Over time, however, a user may need to replace the shaver's blade.

In so-called refillable cartridge-type shavers, the head is removable from the handle, allowing a user to conserve the handle for further use. Nevertheless, the user is still required to replace the entire head (including its cover and guard) in order to replace the blade, even though the cover and/or guard may still be suitable for further use, which is environmentally and economically taxing. In other refillable cartridge-type shavers, the razors may be removeable from the head through mechanisms requiring elaborate steps that involve manipulating tiny and easily lost components. Some cartridge-type shaves require using additional tools. Thus, a user is forced to compromise between efficiency of waste, convenience, safety, cost, and space when choosing a razor system.

U.S. Pat. No. 9,676,111 discloses a shaving system allowing a user to replace the shaver's blade by inserting the shaver's head into a razor treatment device, which then moves the cover to expose and remove the blade.

International application publication No WO 2020/089058 discloses a shaving system with insertable blades that are encased in a water-soluble material.

In all of these systems, the user is able to conserve the head's guard and cover while replacing the blade. This is due to the fact that the shavers disclosed in these documents are refillable shavers in which the blade is removable from the guard and cover. However, these systems are complicated and unwieldy, involve additional expensive manufacturing, have additional components that are easily lost, and require the user to exert forces on small components in close proximity to dangerous cutting edges during insertion and/or removal. There is therefore a need for a better and safer way to replace a shaver's blade.

SUMMARY

According to an example of the present disclosure, a shaving head for a razor device may be provided, including a guard and a retaining mechanism. The retaining mechanism may be moveably connected to the guard. The guard may be configured to receive at least one razor blade. The retaining mechanism may be configured to make the razor blade accessible for detachment from the guard when the retaining mechanism is in a detachment position.

When the retaining mechanism is in the detachment position, the retaining mechanism may remain connected to the guard.

The retaining mechanism may be configured to retain the razor blade to the guard when the retaining mechanism is in a locked position. The retaining mechanism may be moveably connected to the guard by a mechanism that prevents the retaining mechanism from moving to the detachment position when the retaining mechanism is in the locked position. The mechanism may allow the retaining mechanism to move to the detachment position when the retaining mechanism is in an unlocked position. At least one of the retaining mechanism or guard may have a locking element for maintaining the retaining mechanism in the locked position.

The retaining mechanism may include a cover and a blade locker. The cover may be configured to be operated by a user. The blade locker may be configured to control the accessibility of the razor blade for detachment. Movement of the blade locker is operated by the cover.

The blade locker may include at least one slot that corresponds with the at least one blade.

The cover may be connected to the blade locker by an actuator that is configured to convert a movement of the cover toward the detachment position into an unlocking movement of the blade locker. The actuator may also be configured to convert a movement of the cover toward the unlocking position into a locking movement of the blade locker that retains the razor blade to the guard.

The actuator may be configured to convert a rotary motion of the cover about a first axis into a rotatory motion of the blade locker about a second axis.

The actuator may include an engagement portion of the cover that interacts with an engaging portion on the blade locker. When the cover is rotated toward the detachment position, the engagement portion may engage with the engaging portion to rotate the blade locker outward.

The blade locker may include a first blade locker and a second blade locker. The first blade locker may be positioned on a first side of the guard and the second blade locker may be positioned on a second side of the guard.

The shaving head may also include at least one of an interchangeable guard bar or an interchangeable lubrication element. The guard bar and the interchangeable lubrication element may be configured to attach to the guard by a snap-fit feature.

The shaving head may also include a resilient element that may be connected to the guard. The resilient element may be configured to form a cushion for the razor blade.

The resilient element may include a spring-loaded pin configured to contact the at least one razor blade.

Another example of the present disclosure is directed toward a razor system configured for changing the razor blade in a shaving head. The razor system may include a carrier. The carrier may be configured to moveably contain the razor blade for installation into the shaving head.

The carrier may have a spring-like geometry. The carrier may be configured to hold an extended length of the razor blade. When a force is applied to a region of the carrier, the carrier may release the razor blade from the carrier.

The carrier may have a snap-fit feature that is configured to connect with the guard.

Another example of the present disclosure is directed toward a process for changing a razor blade in a shaving head. The cover may be moved into the detachment position. The carrier may be attached to the shaving head. The carrier may at least partially contain a razor blade. A force may be applied to a region of the carrier to release the razor blade from the carrier. The carrier may be removed from the shaving head. The cover may be moved into a locked position.

Other examples are provided herein.

BRIEF DESCRIPTION OF THE DRAWINGS

The disclosure may be more completely understood in consideration of the following detailed description of aspects of the disclosure in connection with the accompanying drawings, in which.

Figure 1A:
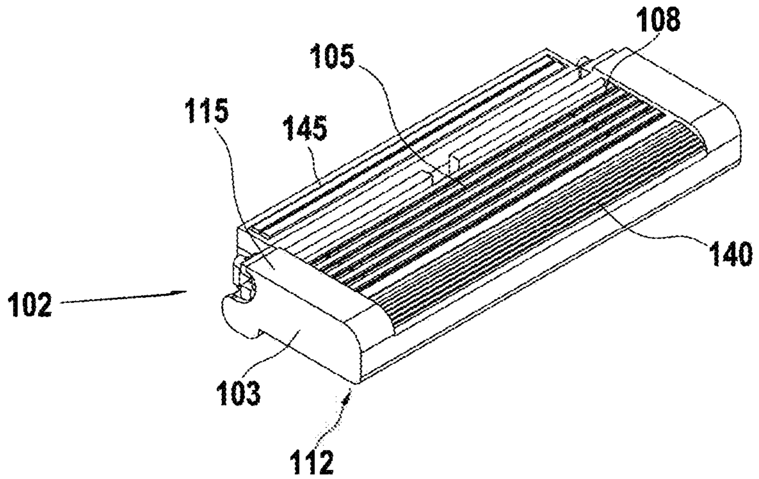
FIG. 1A shows an exemplary shaving head for a razor device.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (for example, "between" versus "directly between," "adjacent" versus "directly adjacent," etc.).

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

Figure 1B:
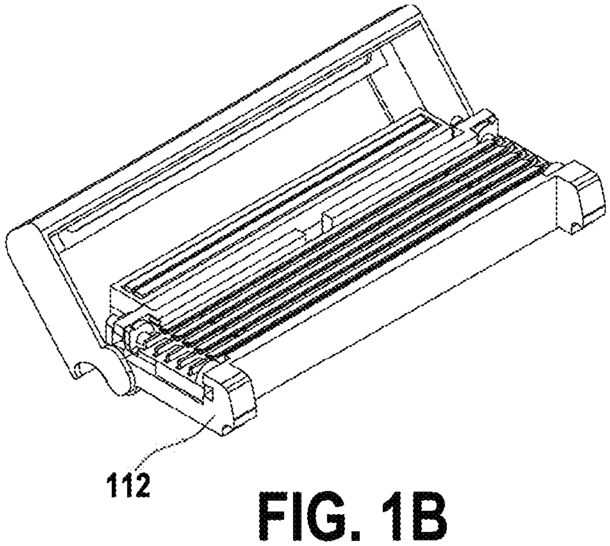
FIG. 1B shows shaving head in an open position.

FIGS. 1A and 1B shows an exemplary shaving head 102 for a razor device in a locked configuration and in a detachment configuration, respectively. The shaving head 102 may include a housing 103 and a shaving area 105 in which the cutting edge of at least one razor blade 108 is presented. During shaving, hair moves relative to the shaving head 102 and enters the shaving area 105, where it may be cut by the blade(s) 108.

In the example illustrated here, the shaving head 102 includes five blades 108 whose cutting edges are arranged within the shaving area 105. Other quantities of blades 108 are also contemplated, such as two, three, or four blades 108, or even six or more blades 108. The blades may be formed into or from a single structure such that all of the blades 108 are connected to each other. The blade structure may be rigid, and the blades 108 may be attached to the blade structure in parallel. In other examples the blades 108 may be independent assemblies comprising a cutting element that is attached to a support (not shown). The cutting element may either be mounted on an inner surface or on an outer surface of the support. In yet another example, the blades may be a single piece comprising a support portion and a bent portion (not shown), thereby forming the known "bent blades".

The head 102 includes a guard 112, visible in FIG. 1B, and a retaining mechanism 115, which are shown in FIG. 1A to be in a locked position. The guard 112 is configured to receive the blade 108. In the locked position, the retaining mechanism 115 is configured to retain the razor blade 108 to the guard 112. In the locked position, the guard 112 and retaining mechanism 115 leave the blade 108 at least partially exposed between them (i.e., the shaving area 105).

The head 102 includes a mechanism between the guard 112 and the retaining mechanism 115 that allows for the retaining mechanism 115 to be moveably connected to the guard 118, such that the shaving head 102 may be configured into the detachment position, as seen in FIG. 1B. When the shaving head 102 is in the detachment position, the shaving head 102 is refillable, meaning that a user may conserve at least a portion of the shaving head 102 while replacing at least another portion of the shaving head 102. More specifically, the user may conserve at least the housing 103 while replacing at least the blades 108.

In examples, the shaving head 102 may also include a skin tensioning device 140 which is arranged toward the front of the shaving head 102. Such placement of the skin tensioning device 140 may allow movement of the shaving head 102 on the skin to bring the skin into contact with the skin tensioning device 140 before bringing the skin into contact with the razor blades 108. The skin tensioning device 140 may be removeably connected to the guard 112, such as by a snap-fit feature, allowing the skin tensioning device 140 to be replaced. It is also conceived that the skin tensioning device may be instead removably connected to the retaining mechanism 115. During shaving, skin and hair which are made to contact the shaving area 105 of the shaving head 102 may be contacted by the skin tensioning device 140 before being contacted by the blades 108 whose cutting edges are in the shaving area 105.

Although the skin tensioning device 140 illustrated here is represented as a series of three so-called "guard fins," it is also contemplated to provide as few as one or two guard fins, or even as many as four or more guard fins. Moreover, it is also contemplated, in addition to or as an alternative to one or more guard fins, for the skin tensioning device 140 to provide a lubricating function. The skin tensioning device 140 may be provided as any known component for a shaving head that is arranged to contact skin as the skin moves towards the blade(s) thereof.

In examples, the shaving head 102 may also include a post-shave device 145 (in this case a lubricating element), which is arranged towards the rear of the shaving head 102, such that the skin tensioning device 140 and the post-shave device 145 are disposed on opposing ends of the shaving face of the shaving head 102 such that the skin tensioning device 140 and post-shave device 145 substantially sandwich the shaving area 105. The post-shave device 145 may be removeably connected to the guard 112, such as by a snap-fit feature, allowing the post-shave device to be replaced. It is conceived that the post-shave device may instead be removeably connected to the retaining mechanism 115. The post-shave device 145 may be configured to contact skin as the skin leaves the shaving area 105, for example in order to soothe the skin and/or to apply one or more products thereto. The post-shave device 105 may be provided as any known component for a shaving head 102 that is arranged to contact skin after the skin has contacted one or more blades 108 of the shaving head 102.

Figure 2A:
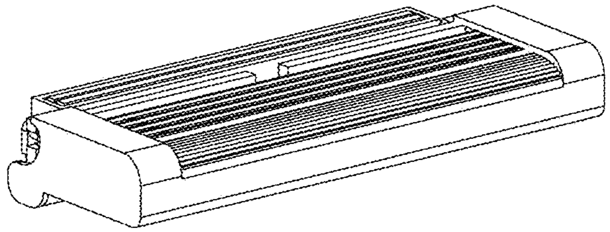
FIG. 2A-D shows the progression of positions of the shaving head during an opening operation.
Figure 2B:
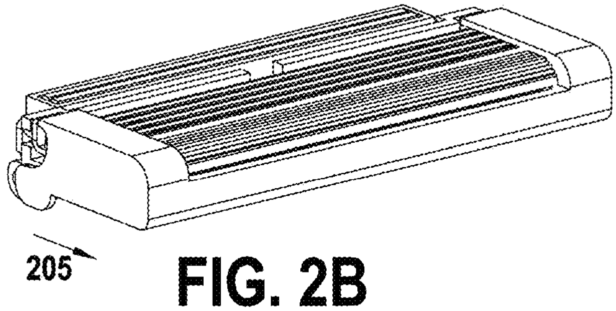
Figure 2C:
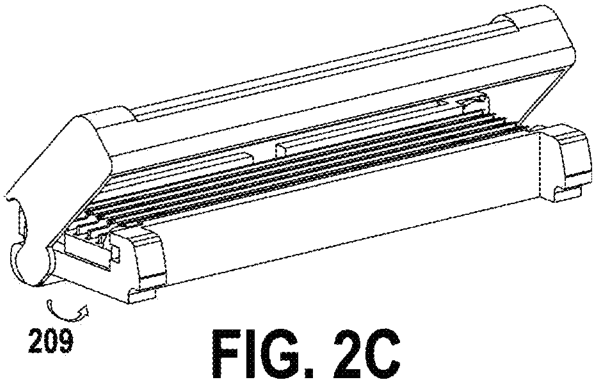
Figure 2D:
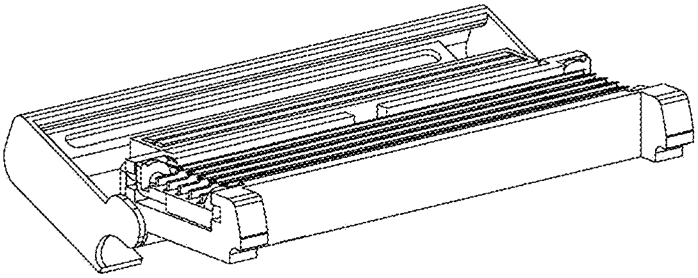

FIGS. 2A-2D demonstrate a functionality of the shaving head 102, wherein the shaving head 102 is configured to allow the retaining mechanism 115 to move between several states: the locking position of FIG. 2A, the unlocking position of FIG. 2B, and the detachment position of FIG. 2D. FIG. 2C shows a transition between the unlocking position and the detachment position.

Turning to FIG. 2A, when the retaining mechanism 115 is in the locking position, the razor blades 108 are retained by the retaining mechanism 115 to the guard 112. Thus, the razor blades 108 cannot be removed from the shaving head 102, nor can new razor blades 108 be inserted into the guard 112. Further, when the retaining mechanism 115 is in the locking position, the retaining mechanism 115 is unable to move to the detachment position. This prevents inadvertent or unwanted movement of the razor blades 108, either during a shaving operation, during inappropriate steps of a razor blade 108 change operation, or storage of the razor device, therefore bolstering the safety of the instrument. The retaining mechanism 115 and/or the guard 112 may be configured to maintain the retaining mechanism 115 in the retaining position so as to prevent the retaining mechanism 115 from inadvertently moving to the unlocking position.

When the retaining mechanism 115 is in a detachment position, such as in FIG. 2D, the retaining mechanism 115 is "open" relative to the guard 112. This means that while the retaining mechanism 115 continues to connect to the guard 112, such as by the actuator, the retaining mechanism 115 is in a position that makes the razor blade 108 accessible for detachment from the guard 112. The retaining mechanism 118 may not move directly from the detachment position of FIG. 2A to the locked position of FIG. 2D. This addresses another safety aspect of the razor device, as it prevents the user from mistakenly believing that the razor blade 108 is secured within the guard 112 when it is actually still loose. It also leads to a more secure locking system, as will be described herein.

FIG. 2B shows that the retaining mechanism 115 may move in the unlocking direction 205 to put the retaining mechanism 115 into the unlocking position. The blades 108 may not be removed from the guard 112 when the retaining mechanism 115 is in the unlocking position as the retaining mechanism may continue to secure the blades 108 to the guard 112. However, the retaining mechanism 115 can move from the unlocking position toward the detachment position, as show in FIG. 2C, wherein the retaining mechanism is rotated in a detachment direction 209 to the detachment position. Returning to FIG. 2B, the retaining mechanism 115 may be moved from the unlocking position into the locking position, such as by sliding the retaining mechanism 115 in the opposite direction of the unlocking direction 205. Thus, the unlocking position is an intermediary between the detachment position and the locking position that enables the retaining mechanism 115 to be moved to either position while preventing direct passage from the detachment position to the locking position, and vice versa.

Figure 3:
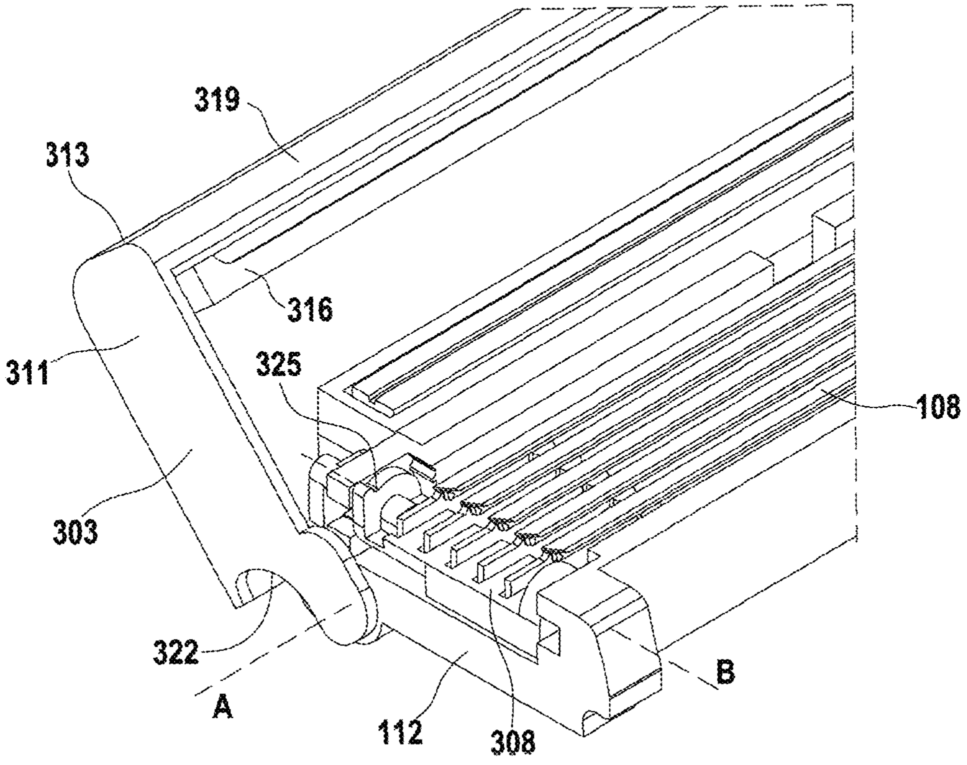
FIG. 3 shows aspects of an exemplary retaining mechanism.

Turning to FIG. 3, the retaining mechanism 115 may comprise a cover 303 that is configured to be operated by a user and a blade locker 308 that is configured to control the accessibility of the razor blade 108 for detachment, wherein movement of the blade locker 308 is operated by the cover 303. The cover 303 is shown to have a side wall 311 and a front wall 313 formed so as to substantially frame the razor blades 108 when the retaining mechanism 115 is in the locking position. Thus, the cover 303 is configured to provide a "window" to the razor blades 108, making the razor blades 108 accessible for a shaving operation. Other configurations for the cover 303 may be conceived.

The cover 303 may be connected to the guard 112 by a locking element or mechanical joint 409 that allows translation of the cover 303 at a first position and a second position, but only allows rotation of the cover 303 at a second position. Put another way, the mechanical joint 409 may prevent rotation of the cover 303 unless the cover 303 is at the second position. For instance, the mechanical joint 409 may be a pin-and-slot joint, wherein one of the cover 303 or guard 112 has a slot and the other has a pin that is disposed within the slot. In an example, the guard 112 may have a first slot on a first side and a second slot on a second side, and the guard may have a first pin on a first side and a second pin on a second side, wherein the first pin and the second pin may be oriented inward toward the blades 108, fixedly connecting the cover 303 to the guard 112. Aspects of the cover 303 and/or guard 112 may restrict rotational movement of the cover 303 when the cover 303 is at certain positions relative to the guard 112. For instance, the cover 303 may have a top wall 316 and a bottom wall 319 that restrict rotation of the cover 303 relative to the guard 112 while still allowing translation of the guard 303, such as in the unlocking direction 205, via the slot-and-pin joint. When the cover 303 is in the second position, the bottom wall 319 may no longer be "blocked" by the guard 112, and thus the cover 303 may be rotated outward from the guard 112 about an axis A that runs between the first pin and the second pin and is parallel to the edge direction of the razor blades 108, allowing the cover 303 to be rotated outward toward the rear of the guard 303, such as in a detachment direction 209.

Aspects of the cover 303 and/or guard 112 may hinder unintended translation of the cover 303. For instance, it is undesirable for the cover 303 to move in the unlocking direction 205 at times other than when a user is performing an unlocking operation, such as during a shaving operation. Thus, the cover 303 and/or guard 112 may include a locking element that prevents the unintended translation. For example, when the mechanical joint 409 is a pin-and-slot joint, the slot may narrow in unlocking direction, introducing a force that must be overcome in order to move the cover 303 to the unlocking position. Other mechanisms are conceivable without deviating from the disclosure.

The blade locker 308 may be positioned between the cover 303 and the guard 112 on an edge of the guard 112. For instance, the blade locker 308 may be orthogonal to the razor blade 108 such that that the orientation of the blade locker 308 traverses the cutting edges of the individual razor blades 108.

Figure 4A:
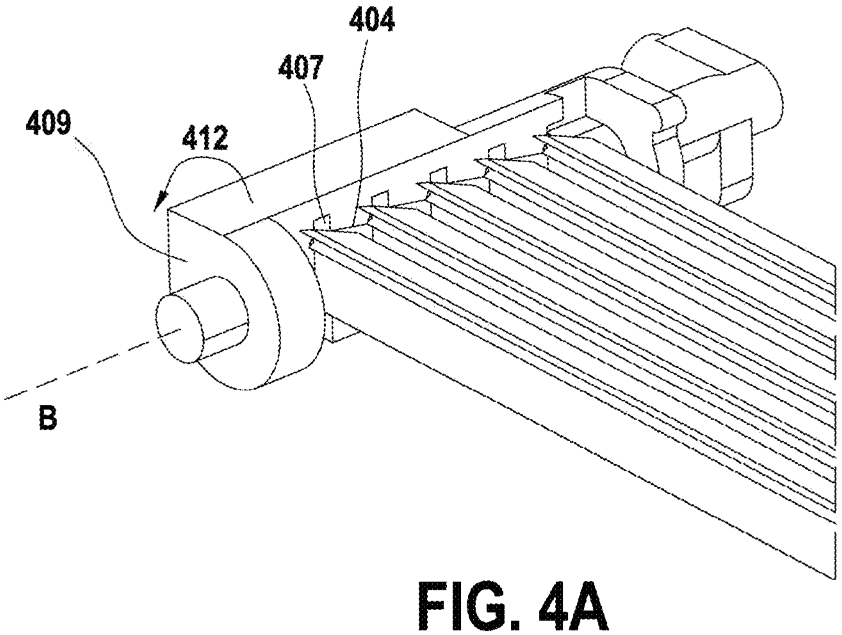
FIG. 4A-B shows the positions of an exemplary blade locker of the shaving head during an opening operation.
Figure 4B:
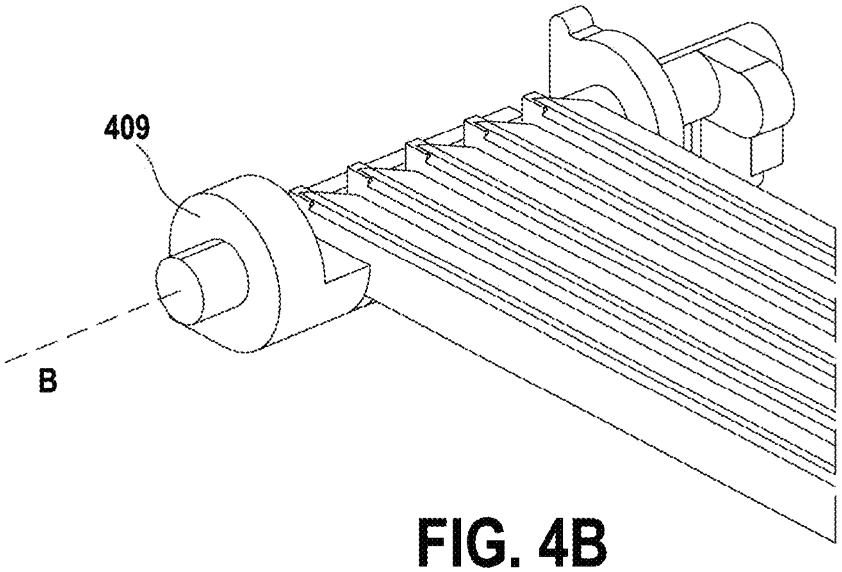

FIGS. 4A and 4B show more detail of the blade locker 308. The blade locker 308 may have at least one slot 404 that correspond with individual razor blades 108. When the blade locker 308 is in a first position, such as in FIG. 4A, the slots 404 may secure the razor blades 108 to the guard 112. The blade locker 308 may also have recesses 407 designed to accommodate other structural aspects of the razor blade 108, such as when the blade locker is in the second position of FIG. 4B.

The blade locker 308 may be connected to the guard 112 by the mechanical joint 409 that allows rotation about a single axis B, such as a pivot joint. The pivot axis B may be orthogonal to the edge direction of the razor blades 108, allowing the blade locker to rotate outward in a lateral direction from the razor blades, such as rotation direction 412. The retaining mechanism 115 may have two blade lockers 308, with each blade locker 308 positioned on opposing ends of the guard 112 and mirroring each other.

Returning to FIG. 3, the blade locker 308 and cover 303 may be connected by an actuator that is configured to convert a rotary motion of the cover 303 about the first axis A into a rotary motion of the blade locker 308 about the second axis B. The actuator may comprise an engagement portion 322 located on the cover 303 that interacts with an engaging portion 325 on the blade locker 308 such when the cover 303 is rotated along the first axis A, the cover engagement portion 322 engages with the blade locker engaging portion 325 to rotate the blade locker 308 along the second axis B. The interacting engagement portion 322 and engaging portion 325 may be, for instance, a nodule and a corresponding ramp. When the ramp is flush with the nodule and the ramp is rotated, the incline of the ramp may push downward on the nodule and cause a rotational effect on the nodule. Other structures for converting rotation around the first axis A into rotation about the second axis B are contemplated.

Returning to FIG. 4A, operation of the blade locker 308 and cover 303 may be configured to allow insertion and removal of razor blades 108 from the shaving head 102. When the cover 303 is in a first position, which is also the locking position of the retaining mechanism 115, the blade locker 308 is in the first position, which is also the locking position, wherein the blade locker 308 secures the razor blades 108 to the guard 112 such that the slots 404 are in substantial contact with the top face of the razor blades 108 so as to substantially prevent movement of the razor blades 108. When the cover 303 is translated to a second position, which is also the unlocking position of the retaining mechanism 115, the blade locker 308 remains in the first position, but the cover engagement portion 322 may contact the blade locker engaging portion 325. When the cover 303 is moved from the unlocking position to the detachment position, the cover engagement portion 322 engages with the blade locker engaging portion 325 to cause the blade locker 308 to perform an unlocking movement wherein the blade locker is rotated in the detachment direction 209, moving the blade locker 308 into the second position, which is an open position, as shown in FIG. 4B. In this open position, the blade locker slots 404 are no longer in contact with the razor blades 108, and thus the razor blades 108 are no longer secured to the guard 112. When the retaining mechanism 102 is in this position, wherein the cover 303 is in the unlocking position and the blade locker 308 is in the open position, the razor blades 108 may be freely detached from the guard 112 and/or the guard 112 may be free to receive razor blades 108. In this way, used razor blades 108 may be disposed and new razor blades may be inserted.

Figure 5:
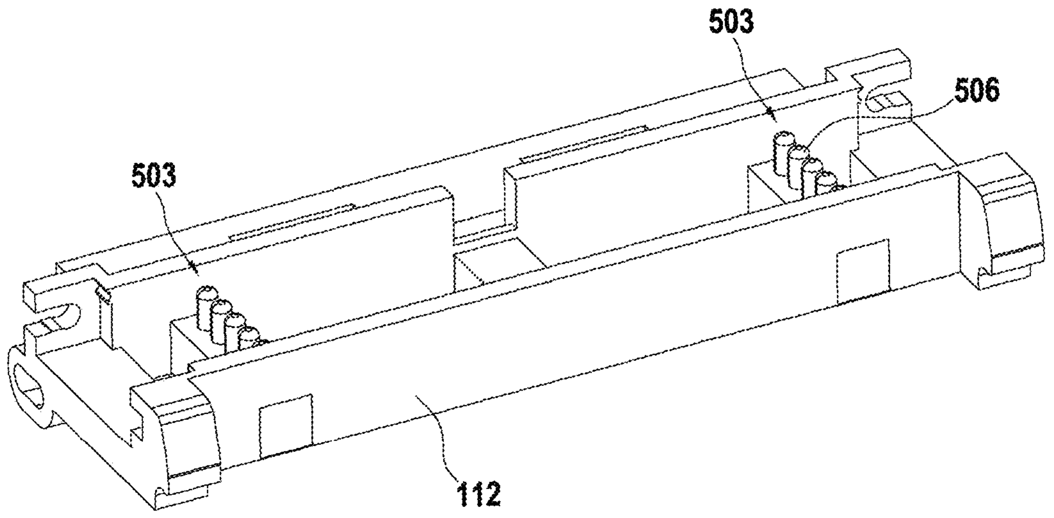
FIG. 5 shows an exemplary resilient element of the shaving head.

In examples, as shown in FIG. 5, the shaving head 102 also includes a resilient element 503 that is configured so as to provide cushioning for the razors blades similarly to a suspension, allowing the razor blades 108 limited, resisted, and/or controlled movement in one direction within the housing. The resilient element 503 may act as a "shock absorber" that eases the pressure of the blades 108 against a skin surface during a shaving operation. The resilient element 503 may include a spring-loaded pin 506 that is disposed within the guard 112 so as to be arranged toward the razor blades 108 and to contact a razor blade 108. Thus, when pressure is applied to the top surface of the razor blades 108, the razor blades 108 may engage with the spring-loaded pin 506. The pressure causes the spring-loaded pin 506 to compress, and the resistance the spring-loaded pin 506 asserts back on the razor in the direction of the pressure increases relative to the degree of compression of the spring-loaded pin 506. In the illustration, the resilient element 503 includes multiple spring-loaded pins 506, and that the spring-loaded pins 506 may be fixed within the guard 112, removably attached to the guard 112, or attached to a housing element that may attach, fixably or removably, to the guard 112.

Figure 6A:
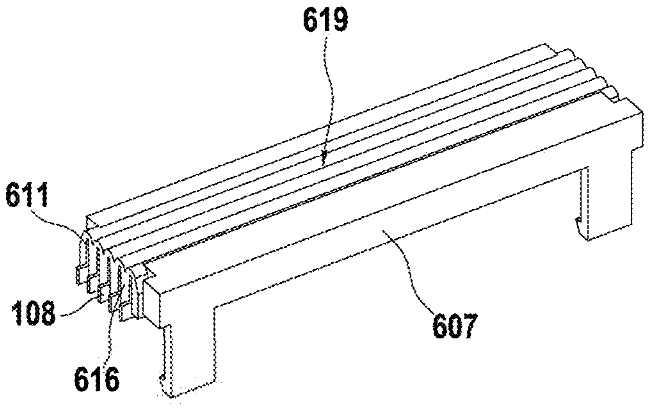
FIG. 6A shows an exemplary carrier for interchanging the razor of the shaving head.
Figure 6B:
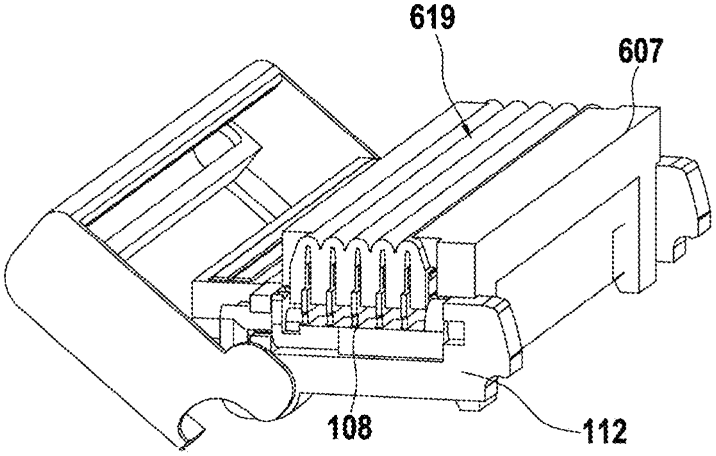
FIG. 6B shows the carrier engaged with the shaving head.

FIG. 6A-B demonstrates an aspect of the disclosure directed toward installation of the razor blades 108 into the shaving head 102. FIG. 6A shows a carrier 607 that is configured to removably contain the razor blade 108 for installation into the shaving head 102. The carrier has "baffles" that act as folds to contain the razor blades 108. Each razor blade 108 fits into a gap 611 of the carrier 607 such that the razor blade is sandwiched between two carrier walls 616. Each carrier wall 616 may be connected to each adjacent carrier wall 616 at a top portion of the carrier walls 616. This forms a spring-like geometry where the carrier 607 is configured to hold an extended length of each razor blade 108. When a force 619 is applied to a region of the carrier, the carrier walls 616 are spread apart, widening each gap 611. The razor blades 108 are no longer secured by the carrier 607 and thus may be released from the carrier 607.

In 6B, the carrier 607 is shown to attach to the shaving head 102. This attachment may be by snap-fit features and allows precise placement of the blades 108 into the shaving head 102. The carrier 607 may contain "fresh" blades 108, and through the mechanism described previously, the carrier may be attached to the shaving head 102 and forced to release the blades 108 into the guard 112. Similarly, the carrier 607 may be worked in reverse to remove "used" blades 108 from the shaving head 112 by applying force 619 to the carrier 607, causing the gaps 611 to spread, thus configuring the carrier into a state where the carrier 607 can engage with each of the razor blades 108. Release force 619 causes the carrier walls 616 to close on the razor blades 108 and securely contain them. In this way, the carrier 607 allows a user to handle razor blades 108 for the shaving head 102 without risk of injury because the carrier 607 shields the user from the cutting edges of the razor blades 108. To this end, the carrier may be formed from a material that can safety engage with the razor blades 108, such as plastic, metal, rubber, or other such materials.

Figure 7A:
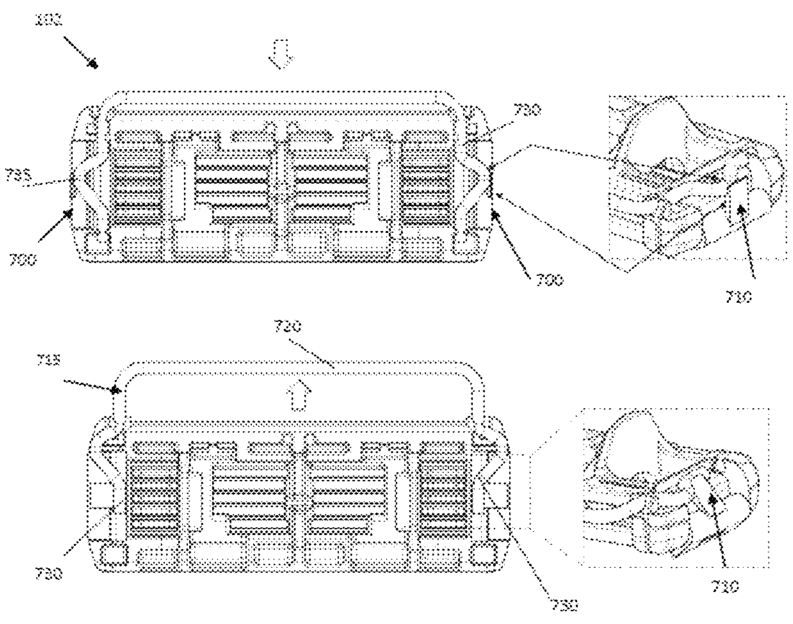
FIG. 7A shows aspects of another exemplary retaining mechanism where the shaving head comprises a pair of retainers.

In an example illustrated in FIG. 7A, the shaving head 102 comprises a top surface, a bottom surface, a front edge, a rear edge and a pair of side edges extending between the front edge and the rear edge and a pair of substantially c-shaped retainers 700 that are configured to secure the blades within the housing 103. At least one or both retainers include an opening from which a flap 710 is protruding the bottom portion of the housing, as it can be seen in FIG. 7. The retaining mechanism comprises a bar 715, in an example made of metal, which is non-removably attached to the bottom portion of the shaving head. The bar comprises a longitudinal portion 720 and a pair of lateral portions 730. At the plane where the lateral portion of the bar faces the flap of the retainer, the lateral portions of the bar comprise a protrusion 735 that is integrally formed with the bar that is in contact with flap of the retainer. When in locking position, the protrusion 735 of the bar 720 applies pressure to the flap 710 of the retainer, thereby preventing any movement of the retainer and consequently secures the blades within the housing. When a user wants to replace the blade assembly, he may pull the bar upwards via the longitudinal side of the bar. With that action, the protrusion of the lateral portion of the bar will no longer push the retainer who will be able to rotate freely thereby allowing the blades to be removed and replaced.

Figure 7B:
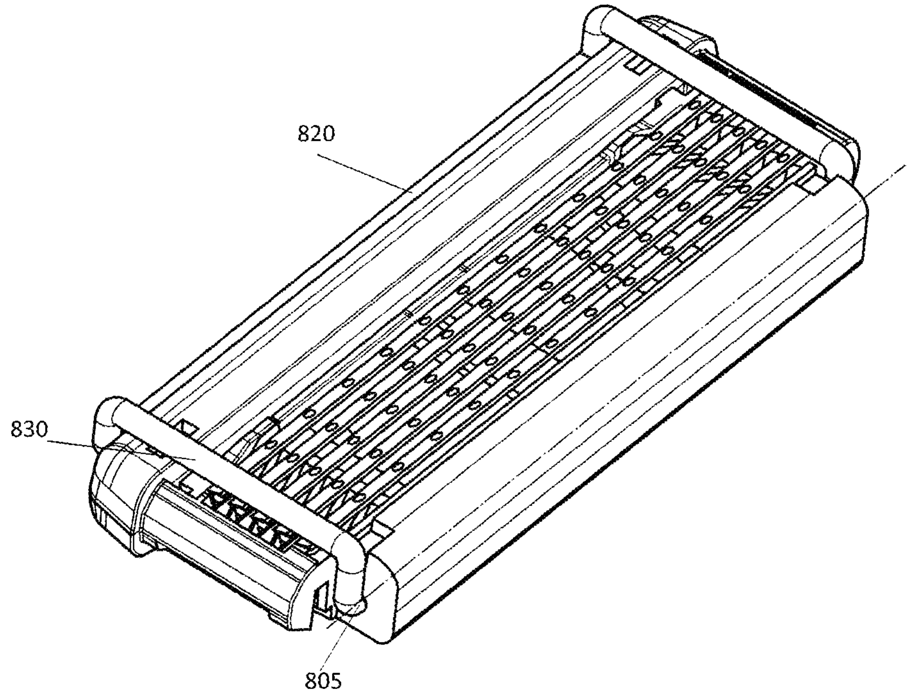
FIG. 7B shows aspects of another exemplary retaining mechanism.
Figure 7B:
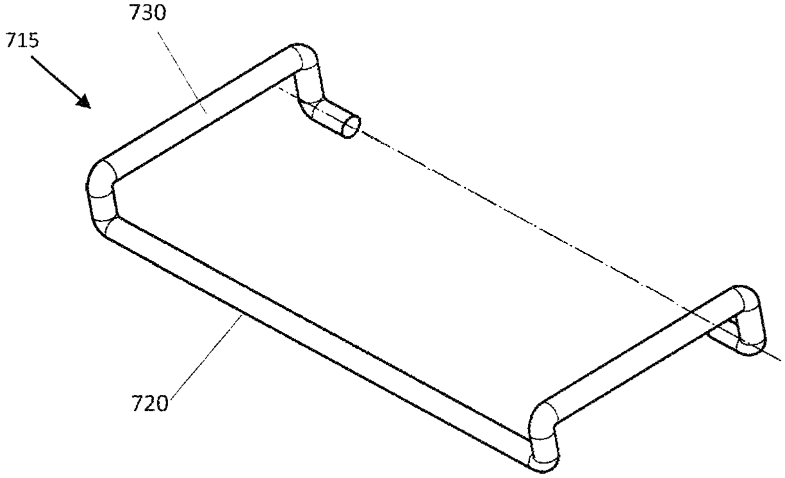

In the example of FIG. 7B, the guard 112 may comprise a pair of openings 805 that are configured to receive a bar 815, in examples made of metal, i.e. steel. The bar 815 comprises a longitudinal portion 820 which is configured to cover at least partially the bottom surface of the shaving head 102, and a pair of lateral portions 830, integrally formed with the longitudinal portion 820. When in locking position, each lateral portion is arranged such that it contacts the side edge of the housing and consequently each cutting blade thereby ensuring that the blades are safely securing within the housing. When a user wants to replace the blades, he may pull the longitudinal portion of the bar, thereby releasing the blade assembly and thus being able to proceed with their replacement.

Throughout the description, including the claims, the term "comprising a" should be understood as being synonymous with "comprising at least one" unless otherwise stated. In addition, any range set forth herein, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A shaving head for a razor device, comprising:

a guard configured to receive at least one razor blade, a retaining mechanism moveably connected to the guard and configured to make the at least one razor blade accessible for detachment from the guard when the retaining mechanism is in a detachment position, wherein the retaining mechanism comprises a cover that is configured to be operated by a user and a blade locker that is configured to control the accessibility of the razor blade for detachment, wherein movement of the blade locker is operated by the cover, wherein the blade locker comprises at least one slot that corresponds with the at least one blade.

2. The shaving head according to claim 1, wherein the retaining mechanism is moveably connected to the guard by a mechanism that prevents the retaining mechanism from moving to the detachment position when the retaining mechanism is in the locked position and allows the retaining mechanism to move to the detachment position when the retaining mechanism is in an unlocked position, wherein at least one of the retaining mechanism or guard has a locking element for maintaining the retaining mechanism in a locked position.

3. The shaving head according to claim 1, wherein the cover is connected to the blade locker by an actuator that is configured to convert a movement of the cover toward the detachment position into an unlocking movement of the blade locker, and to convert a movement of the cover toward the unlocking position into a locking movement of the blade locker that retains the razor blade to the guard.

4. The shaving head according to claim 3, wherein the actuator is configured to convert a rotary motion of the cover about a first axis (A) into a rotatory motion of the blade locker about a second axis (B).

5. The shaving head according to claim 4, wherein the actuator comprises an engagement portion of the cover that interacts with an engaging portion on the blade locker such when the cover is rotated toward the detachment position, the engagement portion engages with the engaging portion to rotate the blade locker outward.

6. The shaving head according to claim 1, wherein the blade locker comprises a first blade locker and a second blade locker, wherein the first blade locker is positioned on a first side of the guard and the second blade locker is positioned on a second side of the guard.

7. The shaving head according to claim 1, further comprising at least one of a skin tensioning device or a post-shave device configured to attach to the retaining mechanism by a snap-fit feature.

8. The shaving head according to claim 1, further comprising a resilient element connected to the guard, wherein the resilient element is configured to form a cushion for the razor blade.

9. The shaving head according to claim 8 wherein the resilient element comprises a spring-loaded pin configured to contact the at least one razor blade.

10. The shaving head according to claim 1 wherein the cover is connected to the guard by a locking element or mechanical joint, wherein the locking element or the mechanical joint is configured to allow the translation of the cover at a first position and a second position, wherein the cover is allowed to rotate only in the second position.

11. The shaving head according to claim 10, wherein the locking element or mechanical joint is a pin and slot joint, wherein one of the cover or the guard has a slot and the other of the cover or the guard has a pin that is disposed within the slot.

12. The shaving head according to claim 11, wherein the guard has a first slot on a first side and a second slot on a second side, wherein the guard has a first pin on a first side and a second pin on a second side, wherein the first pin and the second pin are oriented inward toward the blades, thereby fixedly connecting the cover to the guard.

13. A razor system configured for changing a razor blade in a shaving head, comprising:

the shaving head for a razor device according to claim 1, and a carrier that is configured to removably contain the razor blade for installation into the shaving head, wherein the carrier has a snap-fit feature that is configured to connect with the guard.

14. The razor system of claim 13, wherein the carrier has a spring-like geometry that is configured to hold an extended length of the razor blade and, when force is applied to a region of the carrier, release the razor blade from the carrier.

15. A process for inserting a razor blade into the shaving head of a razor system according to claim 14, comprising:

moving the cover into a detachment position, attaching the carrier that at least partially contains the razor blade to the shaving head, applying a force to a region of the carrier to release the razor blade from the carrier, removing the carrier from the shaving head, and moving the cover into a locked position.

* * * * *